United States Patent
Wu

(10) Patent No.: US 10,917,802 B2
(45) Date of Patent: Feb. 9, 2021

(54) DEVICE AND METHOD OF HANDLING COMMUNICATION OPERATIONS WITH A COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 107 days.

(21) Appl. No.: 15/068,650

(22) Filed: Mar. 14, 2016

(65) Prior Publication Data
US 2016/0269921 A1 Sep. 15, 2016

Related U.S. Application Data

(60) Provisional application No. 62/132,487, filed on Mar. 12, 2015.

(51) Int. Cl.
*H04W 24/08* (2009.01)
*H04W 76/27* (2018.01)
(Continued)

(52) U.S. Cl.
CPC .......... *H04W 24/08* (2013.01); *H04W 24/10* (2013.01); *H04W 76/27* (2018.02); *H04L 5/001* (2013.01); *H04L 5/0091* (2013.01)

(58) Field of Classification Search
CPC . H04W 24/10; H04W 76/046; H04W 84/045; H04W 92/20; H04L 5/0053
See application file for complete search history.

(56) References Cited

U.S. PATENT DOCUMENTS

| 8,644,224 B2 * | 2/2014 | Iwamura | H04W 24/10 370/328 |
| 2011/0317577 A1 * | 12/2011 | Yamada | H04W 24/10 370/252 |

(Continued)

FOREIGN PATENT DOCUMENTS

| EP | 2 566 232 B1 | 7/2016 |
| JP | 4960475 B2 | 6/2012 |

OTHER PUBLICATIONS

ETSI TS 136 300 V12.4.0 (Feb. 2015).
(Continued)

*Primary Examiner* — Yemane Mesfin
*Assistant Examiner* — Mon Cheri S Davenport
(74) *Attorney, Agent, or Firm* — Winston Hsu

(57) ABSTRACT

A base station for handling communication operations with a communication device comprising a storage unit for storing instructions and a processing means coupled to the storage unit. The processing means is configured to execute the instructions stored in the storage unit. The instructions comprise transmitting at least one configuration of a first type for configuring 32 measurement objects (MeasObjects) to the communication device; transmitting at least one configuration of a second type for configuring at least one MeasObject in addition to the 32 MeasObjects to the communication device, wherein the second type is different from the first type; receiving a measurement result corresponding to one of the 32 MeasObjects from the communication device; and receiving a measurement result corresponding to one of the at least one MeasObject from the communication device.

14 Claims, 4 Drawing Sheets

(51) Int. Cl.
*H04W 24/10* (2009.01)
*H04L 5/00* (2006.01)

(56) References Cited

U.S. PATENT DOCUMENTS

| | | | |
|---|---|---|---|
| 2012/0003943 A1* | 1/2012 | Marinier | H04W 36/0083 455/73 |
| 2012/0182896 A1* | 7/2012 | Jang | H04W 24/10 370/252 |
| 2013/0109423 A1 | 5/2013 | Iwamura | |
| 2013/0344868 A1 | 12/2013 | Yamada | |

OTHER PUBLICATIONS

ETSI TS 136 331 V12.4.1 (Feb. 2015).
Search Report dated Jul. 29, 2016 for EP application No. 16160105.9, pp. 1-14.
Ericsson, "Extended measurements ID support", 3GPP TSG RAN WG2 #86, R2-142226, May 19-23, 2014, Seoul, South Korea, XP050793414, pp. 1-2.
Ericsson, "Extended measurements ID support mandatory", 3GPP TSG-RAN WG2 Meeting #87, R2-143961, Aug. 18-22, 2014, Dresden, Germany, XP050817140, pp. 1-12.
3GPP TS 36.331 V12.4.1 (Dec. 2014), "3rd Generation Partnership Project; Technical Specification Group Radio Access Network; Evolved Universal Terrestrial Radio Access (E-UTRA); Radio Resource Control (RRC); Protocol specification (Release 12)", XP050927575, pp. 1-410.
Office action dated Aug. 31, 2019 for IN application No. 201644008607, filing date: Mar. 11, 2016, pp. 1-6.

\* cited by examiner

US 10,917,802 B2

DEVICE AND METHOD OF HANDLING COMMUNICATION OPERATIONS WITH A COMMUNICATION DEVICE

CROSS REFERENCE TO RELATED APPLICATIONS

This application claims the benefit of U.S. Provisional Application No. 62/132,487, filed on Mar. 12, 2015, which is incorporated herein by reference.

BACKGROUND OF THE INVENTION

1. Field of the Invention

The present invention relates to a device and a method used in a wireless communication system, and more particularly, to a device and a method of handling communication operations with a communication device in a wireless communication system.

2. Description of the Prior Art

A long-term evolution (LTE)-advanced (LTE-A) system includes advanced techniques, such as carrier aggregation (CA) and LTE assisted access. As stated in the latest 3GPP standard, a maximum number of measurement object identities (MeasObjectIds) is limited. The eNB is not able to configure the UE to perform measurements on more carries due to the limitation. The eNB cannot configure more carries to the UE to enable CA of more carriers since the eNB does not know signal strength of the more carriers. Thus, a maximum data rate of CA is not reached.

SUMMARY OF THE INVENTION

The present invention therefore provides a device and a method for handling communication operations with a communication device to solve the abovementioned problem.

A base station for handling communication operations with a communication device comprising a storage unit for storing instructions and a processing means coupled to the storage unit. The processing means is configured to execute the instructions stored in the storage unit. The instructions comprise transmitting at least one configuration of a first type for configuring 32 measurement objects (MeasObjects) to the communication device; transmitting at least one configuration of a second type for configuring at least one MeasObject in addition to the 32 MeasObject to the communication device, wherein the second type is different from the first type; receiving a measurement result corresponding to one of the 32 MeasObjects from the communication device; and receiving a measurement result corresponding to one of the at least one MeasObject from the communication device.

A base station for handling communication operations with a communication device comprising a storage unit for storing instructions and a processing means coupled to the storage unit. The processing means is configured to execute the instructions stored in the storage unit. The instructions comprise transmitting at least one configuration of a first type for configuring 32 reporting configurations (ReportConfigs) for measurement results to the communication device; transmitting at least one configuration of a second type for configuring at least one ReportConfig for measurement results in addition to the 32 ReportConfigs to the communication device, wherein the second type is different from the first type; receiving a measurement result corresponding to one of the 32 ReportConfigs from the communication device; and receiving a measurement result corresponding to one of the at least one ReportConfig from the communication device.

A communication device for handling communication operations with a base station comprising a storage unit for storing instructions and a processing means coupled to the storage unit. The processing means is configured to execute the instructions stored in the storage unit. The instructions comprise receiving at least one configuration of a first type for configuring 32 MeasObjects from the base station; receiving at least one configuration of a second type for configuring at least one MeasObject in addition to the 32 MeasObjects from the base station, wherein the second type is different from the first type; transmitting a measurement result corresponding to one of the 32 MeasObjects to the base station; and transmitting a measurement result corresponding to one of the at least one MeasObject to the base station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
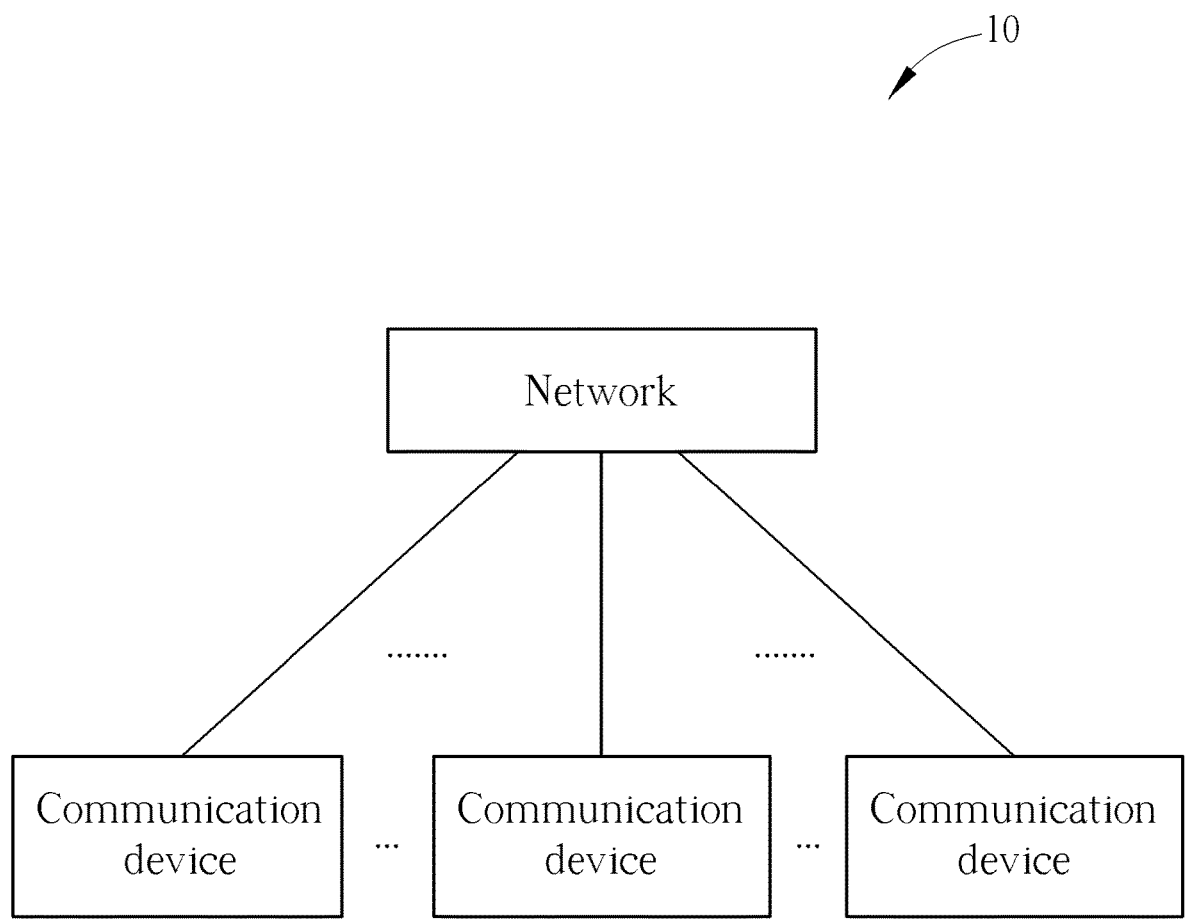
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) comprising at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network (CN), wherein the core network includes network entities such as Mobility Management Entity (MME), and/or Self-Organizing Networks (SON) server, etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the CN, and the decisions corresponding to the information are made at the CN after the CN processes the information. In addition, the information can be processed by both the UTRAN/E-UTRAN and the CN, and the decisions are made after coordination and/or cooperation are performed by the UTRAN/E-UTRAN and the CN.

A communication device can be a user equipment (UE), a mobile phone, a laptop, a tablet computer, an electronic book, a portable computer system, a vehicle or an aircraft. In addition, the network and the communication device can be seen as a transmitter or a receiver, e.g., for an uplink, the communication device is the transmitter and the network is the receiver, and for a downlink, the network is the transmitter and the communication device is the receiver.

Figure 2:
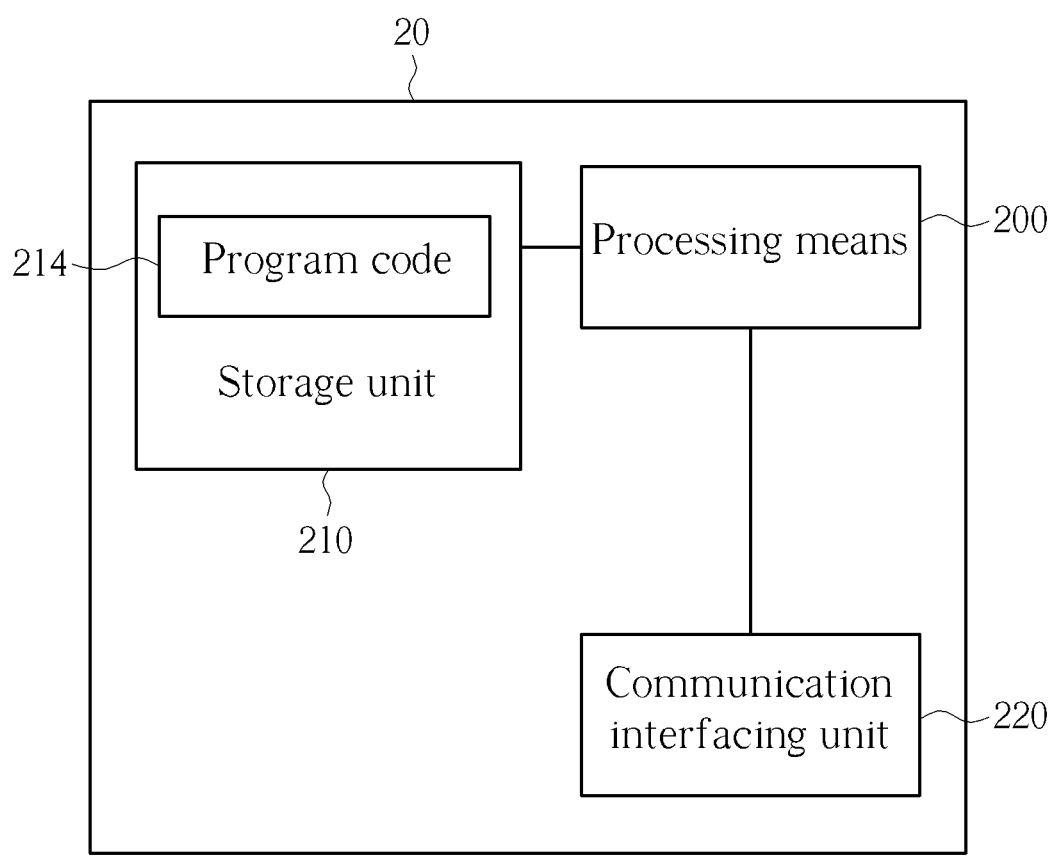
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200. For simplicity, the UE is used to represent the communication device in FIG. 1 in the following examples.

Figure 3:
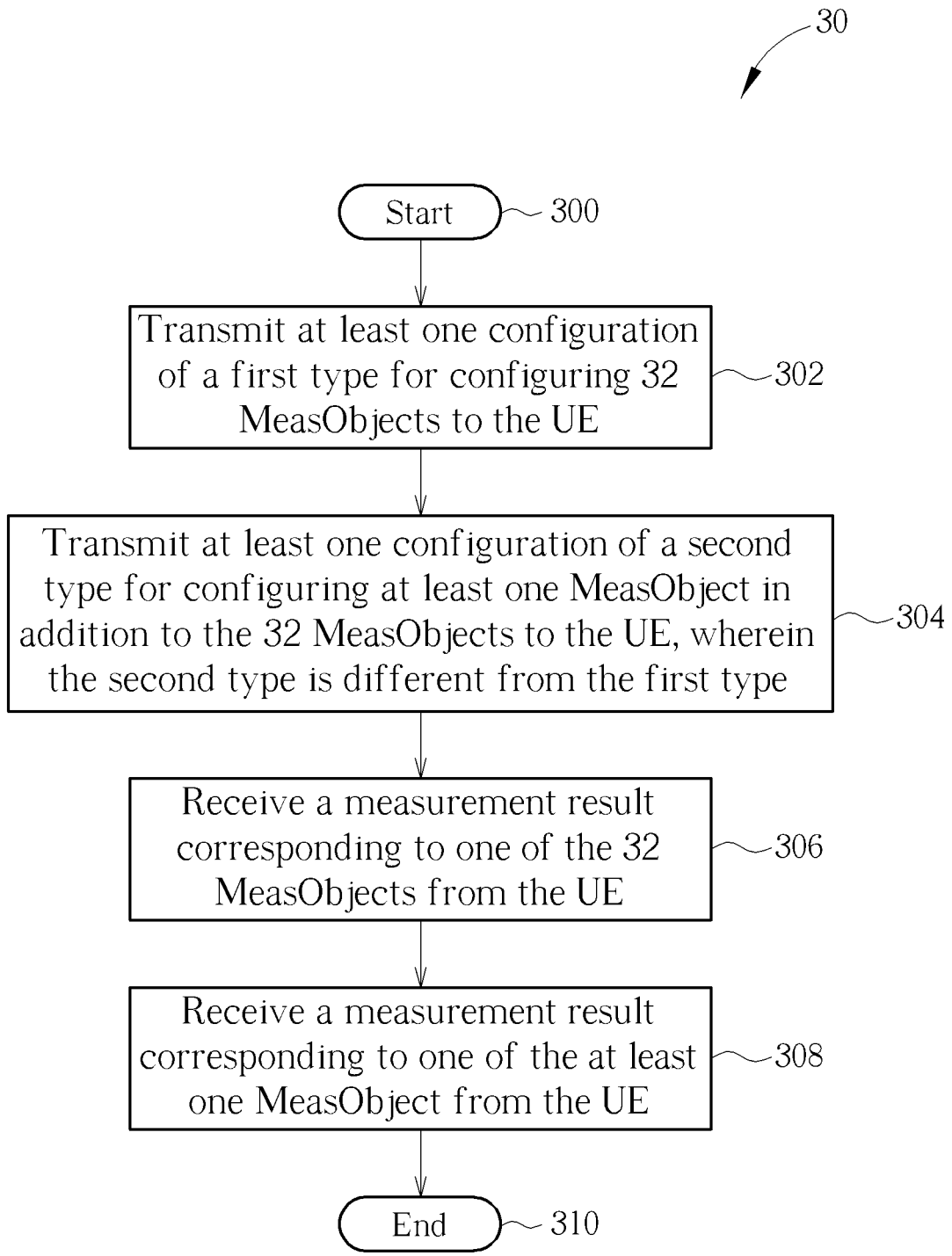
FIG. 3 is a flowchart of a process according to an example of the present invention.

FIG. 3 is a flowchart of process 30 according to an example of the present invention. The process 30 may be utilized in a base station (BS) (e.g., of the network in FIG. 1), to handle communication operations with a UE (e.g., a communication device in FIG. 1). The process 30 may be compiled into the program code 214 and includes the following steps:

Step 300: Start.

Step 302: Transmit at least one configuration of a first type for configuring 32 measurement objects (MeasObjects) to the UE.

Step 304: Transmit at least one configuration of a second type for configuring at least one MeasObject in addition to the 32 MeasObjects to the UE, wherein the second type is different from the first type.

Step 306: Receive a measurement result corresponding to one of the 32 MeasObjects from the UE.

Step 308: Receive a measurement result corresponding to one of the at least one MeasObject from the UE.

Step 310: End.

According to the process 30, the BS may transmit at least one configuration of a first type for configuring 32 MeasObjects to the UE. The BS may transmit at least one configuration of a second type for configuring at least one MeasObject in addition to the 32 MeasObjects to the UE, wherein the second type is different from the first type. Then, the BS may receive a measurement result corresponding to one of the 32 MeasObjects from the UE. The BS may receive a measurement result corresponding to one of the at least one MeasObject from the UE. That is, in addition to the original 32 MeasObjects, the BS may configure additional MeasObject(s) to the UE for the UE to perform measurements corresponding to the additional MeasObjects. Thus, the limitation of the maximum number of the MeasObjects which can be configured is solved. As a result, the UE can receive services via more carriers from the BS to improve a data rate of the UE.

In the 3GPP standard, the maximum number of the MeasObjectIds is 32. That is, the maximum number of MeasObjects which can be configured is 32 and the BS can only configure at most 32 MeasObjects where each corresponding to a different carrier frequency, to the UE to measure. In addition, the BS may not be able to configure the UE to perform inter radio access technology (inter-RAT) measurements on global system for mobile communication (GSM) carrier(s), UMTS carrier(s), code division multiple access 2000 (CDMA2000) carrier(s) or WiFi, or to perform measurements on an LTE carrier under the limitation of the maximum number of the MeasObjects, when the BS has configured 32 LTE carriers for the CA to the UE. Consequently, the BS cannot handover the UE from a LTE to non-LTE RAT (e.g., GSM, UMTS, CDMA2000 or WiFi) since the BS does not receive any measurement result of the non-LTE RAT, or cannot replace one of the 32 LTE carriers with the LTE carrier since the BS does not receive any measurement result of the LTE carrier. The problems above can be solved by the process 30.

Realization of the present invention is not limited to the above description. The following example may be applied to the process 30.

In one example, the at least one configuration of the first type may be transmitted in at least one first RRCConnectionReconfiguration message, and the at least one configuration of the second type may be transmitted in at least one second RRCConnectionReconfiguration message. In one example, the at least one configuration of the first type may include (or may simply be) at least one MeasObjectToAddModList, and the at least one configuration of the second type may include (or may simply be) at least one MeasObjectToAddModListExt. That is, the BS may transmit the at least one first RRCConnectionReconfiguration message including the at least one MeasObjectToAddModList to the UE for configuring the 32 MeasObjects. The BS may transmit the at least one second RRCConnectionReconfiguration message including the at least one MeasObjectToAddModListExt to the UE for configuring the at least one MeasObject in addition to the 32 MeasObjects.

Further, the BS may transmit a MeasObjectToRemoveList to the UE to remove one of the 32 MeasObjects configured by one of the at least one MeasObjectToAddModList. The BS may transmit a MeasObjectToRemoveListExt to the UE to remove one of the at least one MeasObject configured by one of the at least one MeasObjectToAddModListExt. The UE removes the one of the 32 MeasObjects configured by the MeasObjectToAddModList, when the UE receives the MeasObjectToRemoveList. The UE removes the one of the at least one MeasObjects configured by the MeasObjectToAddModListExt, when the UE receives the MeasObjectToRemoveListExt In one example, the BS may transmit the at least one configuration of the second type to the UE, after the UE is configured with the 32 MeasObjects according to the at least one configuration of the first type, and/or after receiving an indicator from the UE for indicating that the UE supports more than 32 MeasObjects.

Each of the 32 MeasObjects is configured by the BS with a first MeasObject identity (MeasObjectId) and the first MeasObjectId is included in the at least one configuration of the first type. That is, the 32 MeasObjects may be configured with 32 first MeasObjectIds, respectively, and the at least one MeasObject may be configured with at least one MeasObjectId, respectively. In one example, the each first MeasObjectId has a different value in a first range 1, 2, . . . , 32. The UE uses a first MeasObjectId to identify the first MeasObject, when the UE receives both the first MeasObject and the first MeasObjectId associated to the first MeasObject in the MeasObjectToAddModList. The UE may measure the first MeasObject identified by the first MeasObjectId, and report measurement result(s) of the first MeasObject and a first measurement identity to the BS. The UE may remove the first MeasObject identified by the first MeasObjectId, when the UE receives the first MeasObjectId in a MeasObjectToRemoveList from the BS.

Each of the at least one MeasObjectId is configured by the BS with a second MeasObjectId and the second MeasObjectId is included in the at least one configuration of the second type. In one example, the each second MeasObjectId has a different in the first range, i.e. 1, 2, . . . , 32. The UE determines a second MeasObject is identified by (the second MeasObjectId+32), when the UE receives both the second MeasObject and the second MeasObjectId associated to the second MeasObject in the MeasObjectToAddModListExt. The UE may measure the second MeasObject identified by (the second MeasObjectId+32), and report measurement result(s) of the second MeasObject and a second measurement identity to the BS. Similarly, the UE may remove the second MeasObject identified by (the second MeasObjectId+32), when the UE receives the second MeasObjectId in a MeasObjectToRemoveListExt from the BS.

In another example, the each second MeasObjectId has different value in a second range 33, 34, . . . , a max value. The UE determines a second MeasObject is identified by the second MeasObjectId, when the UE receives both the second MeasObject and the second MeasObjectId associated to the second MeasObject in the MeasObjectToAddModListExt. The UE may measure the second MeasObject identified by the second MeasObject, and report measurement result(s) of the second MeasObject and a third measurement identity to the UE. The second MeasObjectId may be a newly defined IE (e.g. MeasObjectId-v13xy). Similarly, the UE may remove the second MeasObject identified by the second MeasObjectId, when the UE receives the second MeasObjectId in a MeasObjectToRemoveListExt from the BS. Further, the max value of the second range may be defined by a parameter maxObjectId-r13. In one example, the parameter maxObjectId-r13 may be equal to or larger than 64 (e.g., 96 or 128). Compared with the previous example, the UE can use the second MeasObjectId directly to identify a MeasObject without deriving the function of (the MeasObjectId+32).

Thus, according to the above description, the BS uses the at least one configuration of the first type for configuring 1, 2, . . . , 32 MeasObjects to UEs supporting or not supporting more than 32 MeasObjects. The BS uses the at least one configuration of the second type for configuring the at least one MeasObject in addition to the 32 MeasObjects to UEs supporting more than 32 MeasObjects.

Figure 4:
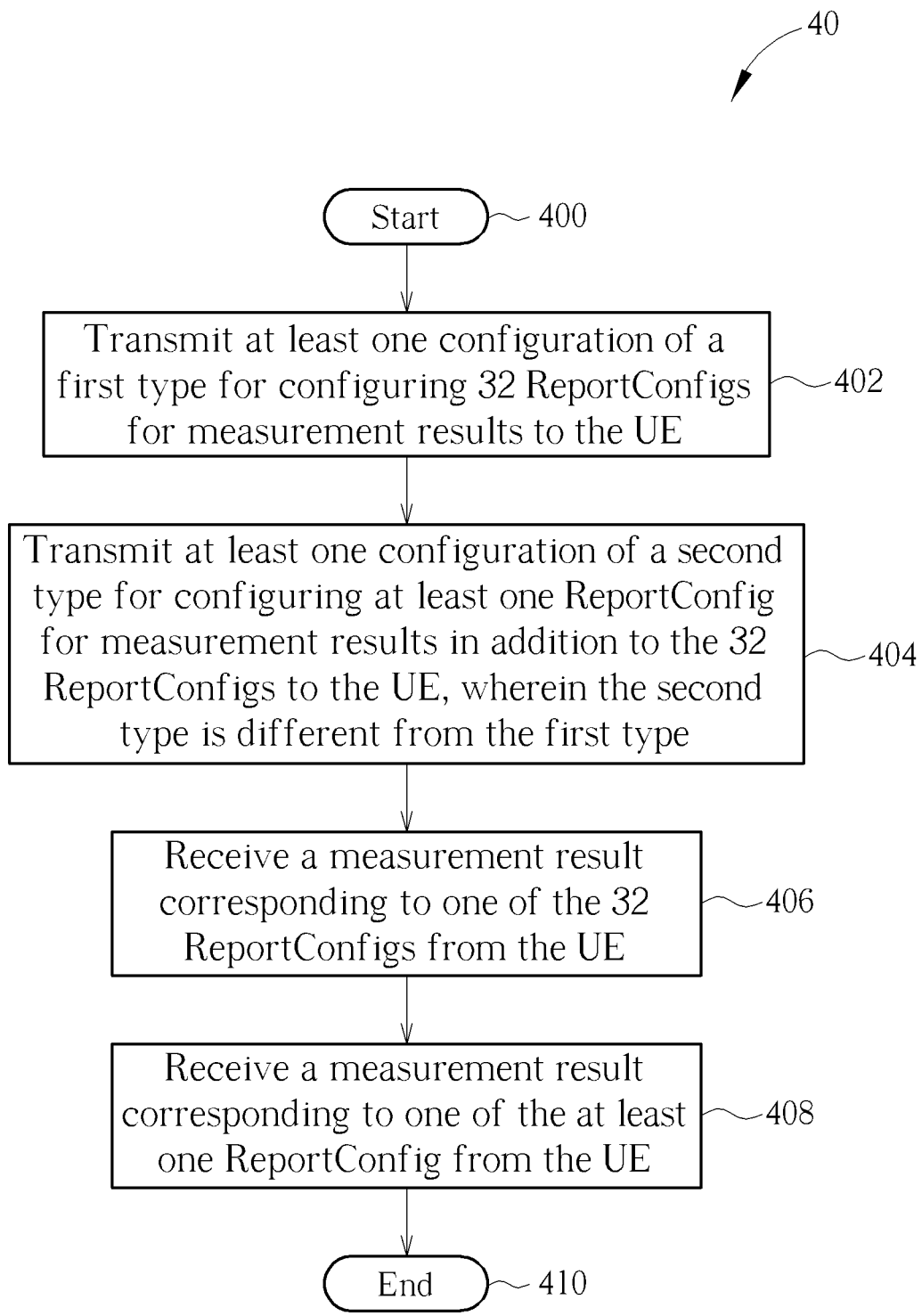
FIG. 4 is a flowchart of a process according to an example of the present invention.

FIG. 4 is a flowchart of process 40 according to an example of the present invention. The process 40 may be utilized in a base station (BS) (e.g., of the network in FIG. 1), to handle communication operations with a UE (e.g., a communication device in FIG. 1). The process 40 may be compiled into the program code 214 and includes the following steps:

Step 400: Start.

Step 402: Transmit at least one configuration of a first type for configuring 32 reporting configurations (ReportConfigs) for measurement results to the UE.

Step 404: Transmit at least one configuration of a second type for configuring at least one ReportConfig for measurement results in addition to the 32 ReportConfigs to the UE, wherein the second type is different from the first type.

Step 406: Receive a measurement result corresponding to one of the 32 ReportConfigs from the UE.

Step 408: Receive a measurement result corresponding to one of the at least one ReportConfig from the UE.

Step 410: End.

According to the process 40, the BS may transmit at least one configuration of a first type for configuring 32 ReportConfigs for measurement results to the UE. The BS may transmit at least one configuration of a second type for configuring at least one ReportConfig for measurement results in addition to the 32 ReportConfigs to the UE, wherein the second type is different from the first type. Then, the BS may receive a measurement result corresponding to one of the 32 ReportConfigs from the UE. The BS may receive a measurement result corresponding to one of the at least one ReportConfig from the UE. That is, in addition to the original 32 ReportConfigs, the BS may configure additional ReportConfig(s) to the UE for the UE to report measurements corresponding to the additional ReportConfigs. Thus, the limitation of the maximum number of the ReportConfigs is solved. As a result, the UE can receive services via more carriers from the BS to improve a data rate of the UE.

In the 3GPP standard, the maximum number of ReportConfigs configured by the BS to the UE for reporting measurement results is 32. The BS cannot configure more than 32 ReportConfigs to the UE. The BS may not be able to configure the UE to report measurement results in ways intended by the BS. This may impact mobility management and/or component carrier management in the CA. The problem can be solved by the process 40.

Realization of the present invention is not limited to the above description. The following example may be applied to the process 40.

In one example, the at least one configuration of the first type may be transmitted in at least one first RRCConnectionReconfiguration message, and the at least one configuration of the second type may be transmitted in at least one second RRCConnectionReconfiguration message. In one example, the at least one configuration of the first type may include (or may simply be) at least one ReportConfigToAddModList, and the at least one configuration of the second type may include (or may simply be) at least one ReportConfigToAddModListExt. That is, the BS may transmit the at least one first RRCConnectionReconfiguration message including the at least one ReportConfigToAddModList to the UE for configuring the 32 ReportConfigs. The BS may transmit the at least one second RRCConnectionReconfiguration message including the at least one ReportConfigToAddModListExt to the UE for configuring the at least one ReportConfig in addition to the 32 ReportConfigs.

Further, the BS may transmit a ReportConfigToRemoveList to the UE to remove one of the 32 ReportConfigs configured by one of the at least one ReportConfigToAddModList. The BS may transmit a ReportConfigToRemoveListExt to the UE to remove one of the at least one ReportConfig configured by one of the at least one ReportConfigToAddModListExt. The UE removes the one of the 32 ReportConfigs configured by the ReportConfigToAddModList, when the UE receives the ReportConfigToRemoveList. The UE removes the one of the at least one ReportConfig configured by one of the at least one ReportConfigToAddModListExt, when the UE receive the ReportConfigToRemoveListExt.

In one example, the BS may transmit the at least one configuration of the second type to the UE, after the UE is configured with the 32 ReportConfigs according to the at least one configuration of the first type, and/or after receiving an indicator from the UE for indicating that the UE supports more than 32 ReportConfigs.

Each of the 32 ReportConfigs is configured by the BS with a first ReportConfig identity (ReportConfigId) and the first ReportConfigId is included in the at least one configuration of the first type. That is, the 32 ReportConfigs may be configured with 32 first ReportConfigIds, respectively. In one example, the each first ReportConfigId has a different value in a first range 1, 2, . . . , 32. The UE uses a first ReportConfigId to identify the first ReportConfig, when the UE receives both the first ReportConfig and the first ReportConfigId associated to the first ReportConfig in the ReportConfigToAddModList. The UE may measure a first MeasObject identified by a first MeasObjectId, and report measurement result(s) of the first MeasObject and a first measurement identity to the BS according to the first ReportConfig identified by the ReportConfigId. The UE may remove the first ReportConfig identified by the first ReportConfigId, when the UE receives the first ReportConfigId in a ReportConfigToRemoveList from the BS.

Each of the at least one ReportConfig is configured by the BS with a second ReportConfigId and the second ReportConfigId is included in the at least one configuration of the second type. In one example, the each second ReportConfigId has a different value in the first range. The UE determines a second ReportConfig is identified by (the second ReportConfigId+32), when the UE receives both the second ReportConfig and the second ReportConfigId associated to the second ReportConfig in the ReportConfigToAddModListExt. The UE may measure a second MeasObject identified by a second MeasObjectId, and report measurement result(s) of the second MeasObject and a second measurement identity to the BS according to the second ReportConfig identified by the second ReportConfigId. The UE may remove the second ReportConfig identified by (the second ReportConfigId+32), when the UE receives the second ReportConfig Id in a ReportConfigToRemoveListExt from the BS.

In another example, the each second ReportConfigId has a value in a second range 33, 34, . . . , a max value. The UE determines a second ReportConfig is identified by the second ReportConfigId, when the UE receives both the second ReportConfig and the second ReportConfigId associated to the second ReportConfig in the ReportConfigToAddModListExt. The UE may measure a second MeasObject identified by a second MeasObjectId, and report measurement result(s) of the second MeasObject and a second measurement identity to the UE according to the second ReportConfig. The second ReportConfigId may be a newly defined IE (e.g. ReportConfigId-v13xy). The UE may remove the second ReportConfig identified by the second ReportConfigId, when the UE receives the second ReportConfigId in a ReportConfigToRemoveListExt from the BS. Further, the max value of the second range may be defined by a parameter maxReportConfigId-r13. In one example, the parameter maxReportConfigId-r13 is equal to or larger than 64 (e.g., 96 or 128). Compared with the previous example, the UE can use the second ReportConfigId directly to identify a ReportConfig without deriving the function of (the ReportConfigId+32).

Thus, according to the above description, the BS uses the at least one configuration of the first type for configuring 1, 2, . . . , 32 ReportConfigs to UEs supporting or not supporting more than 32 ReportConfigs. The BS uses the at least one configuration of the second type for configuring the at least one ReportConfig in addition to the 32 ReportConfigs to UEs supporting more than 32 ReportConfigs.

Those skilled in the art should readily make combinations, modifications and/or alterations on the abovementioned description and examples. The embodiments above are described in terms of the BS but the skill in the art would easily construct methods for the UE from the embodiments. The abovementioned description, steps and/or processes can be realized by means that could be hardware, software, firmware, an electronic system, or combination thereof. An example of the means may be the communication device 20.

To sum up, the present invention provides a device and a method for handling communication operations with a communication device. Thus, the limitation of the maximum number of the MeasObjects (and/or ReportConfigs) is solved Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station for handling communication operations with a user equipment (UE), comprising:
a storage unit for storing instructions of:
the base station receiving an indicator for indicating that the UE supports more than 32 measurement objects (MeasObjects);
the base station transmitting at least one configuration of a first type for configuring 32 MeasObjects to the UE;
the base station transmitting at least one configuration of a second type for configuring at least one MeasObject in addition to the 32 MeasObjects to the UE after receiving the indicator, wherein the second type is different from the first type;
the base station receiving a first measurement result corresponding to one of the 32 MeasObjects from the UE; and
the base station receiving a second measurement result corresponding to one of the at least one MeasObject from the UE;
wherein each of the 32 MeasObjects is configured with a first MeasObject identity (MeasObjectId), and each of the at least one MeasObject is configured with a second MeasObjectId; and the each first MeasObjectId has a different value in a first range 1, 2, . . . , 32, and the each second MeasObjectId has a different value in a second range 33, 34, . . . , a max value and the max value is equal to or large than 64; and
a processing means, coupled to the storage unit, configured to execute the instructions stored in the storage unit.

2. The base station of claim 1, wherein the at least one configuration of the first type is transmitted in at least one first RRCConnectionReconfiguration message, and the at least one configuration of the second type is transmitted in at least one second RRCConnectionReconfiguration message.

3. The base station of claim 1, wherein the at least one configuration of the first type comprises at least one MeasObjectToAddModList, and the at least one configuration of the second type comprises at least one MeasObjectToAddModListExt.

4. The base station of claim 3, wherein the storage unit further stores an instruction of:
transmitting a MeasObjectToRemoveList to the UE to remove one of the 32 MeasObjects configured by one of the at least one MeasObjectToAddModList; or
transmitting a MeasObjectToRemoveListExt to the UE to remove one of the at least one MeasObject configured by one of the at least one MeasObjectToAddModListExt.

5. The base station of claim 1, wherein the storage unit further stores an instruction of:
transmitting the at least one configuration of the second type to the UE, after the UE is configured with the 32 MeasObjects according to the at least one configuration of the first type.

6. A base station for handling communication operations with a user equipment (UE), comprising:
a storage unit for storing instructions of:
the base station receiving an indicator for indicating the UE supports more than 32 reporting configurations (ReportConfigs);
the base station transmitting at least one configuration of a first type for configuring 32 ReportConfigs for measurement results to the UE;
the base station transmitting at least one configuration of a second type for configuring at least one ReportConfig for measurement results in addition to the 32 ReportConfigs to the UE after receiving the indicator, wherein the second type is different from the first type;
the base station receiving a first measurement result corresponding to one of the 32 ReportConfigs from the UE; and
the base station receiving a second measurement result corresponding to one of the at least one ReportConfig from the UE;
wherein each of the 32 ReportConfigs is configured with a first ReportConfig identity (ReportConfigId), and each of the at least one ReportConfig is configured with a second ReportConfigId; and the each first ReportConfigId has a different value in a first range 1, 2, . . . , 32, and the each second ReportConfigId has a different value in a second range 33, 34, . . . , a max value and the max value is equal to or large than 64; and
a processing means, coupled to the storage unit, configured to execute the instructions stored in the storage unit.

7. The base station of claim 6, wherein the at least one configuration of the first type is transmitted in at least one first RRCConnectionReconfiguration message, and the at least one configuration of the second type is transmitted in at least one second RRCConnectionReconfiguration message.

8. The base station of claim 6, wherein the at least one configuration of the first type comprises at least one ReportConfigToAddModList and the at least one configuration of the second type comprises at least one ReportConfigToAddModListExt.

9. The base station of claim 8, wherein the storage unit further stores an instruction of:
transmitting a ReportConfigToRemoveList to the UE to remove one of the 32 ReportConfigs configured by one of the at least one ReportConfigToAddModList; or
transmitting a ReportConfigToRemoveListExt to the UE to remove one of the at least one ReportConfig configured by one of the at least one ReportConfigtToAddModListExt.

10. The base station of claim 6, wherein the storage unit further stores an instruction of:
transmitting the at least one configuration of the second type to the UE, after the UE is configured with the 32 ReportConfigs according to the at least one configuration of the first type.

11. A user equipment (UE) for handling communication operations with a base station, comprising:
a storage unit for storing instructions of:
the UE transmitting an indicator to the base station for indicating that the communication device supports more than 32 measurement objects (MeasObjects);
the UE receiving at least one configuration of a first type for configuring 32 MeasObjects from the base station;
the UE receiving at least one configuration of a second type for configuring at least one MeasObject in addition to the 32 MeasObjects from the base station after transmitting the indicator, wherein the second type is different from the first type;
the UE transmitting a first measurement result corresponding to one of the 32 MeasObjects to the base station; and
the UE transmitting a second measurement result corresponding to one of the at least one MeasObject to the base station;
wherein each of the 32 MeasObjects is configured with a first MeasObject identity (MeasObjectId) and each of the at least one MeasObject is configured with a second MeasObjectId; and the each first MeasObjectId has a different value in a first range 1, 2, . . . , 32, and the each second MeasObjectId has a different value in a second range 33, 34, . . . , a max value and the max value is equal to or large than 64; and
a processing means, coupled to the storage unit, configured to execute the instructions stored in the storage unit.

12. The UE of claim 11, wherein the at least one configuration of the first type comprises at least one MeasObjectToAddModList, and the at least one configuration of the second type comprises at least one MeasObjectToAddModListExt.

13. The UE of claim 12, wherein the storage unit further stores an instruction of:
receiving a MeasObjectToRemoveList from the base station to remove one of the 32 MeasObjects configured by one of the at least one MeasObjectToAddModList; or
receiving a MeasObjectToRemoveListExt from the base station to remove one of the at least one MeasObject configured by one of the at least one MeasObjectToAddModListExt.

14. The UE of claim 11, wherein the storage unit further stores an instruction of:
receiving the at least one configuration of the second type from the base station, after the communication device is configured with the 32 MeasObjects according to the at least one configuration of the first type.

* * * * *